(12) United States Patent
Dietrich et al.

(10) Patent No.: US 12,417,456 B2
(45) Date of Patent: *Sep. 16, 2025

(54) SYSTEMS AND METHODS FOR IMPROVED VERIFICATION OF TRANSACTIONS

(71) Applicant: Wells Fargo Bank, N.A., San Francisco, CA (US)

(72) Inventors: David Dietrich, Charlotte, NC (US); Iris Duncan, Oakton, VA (US); Bryan Kroll, San Mateo, CA (US); Paul Ku, San Francisco, CA (US); Kristine Ing Kushner, Orinda, CA (US); David G. Lamb, Alameda, CA (US); Darrell L. Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,998

(22) Filed: Mar. 25, 2024

(65) Prior Publication Data
US 2024/0232881 A1    Jul. 11, 2024

Related U.S. Application Data

(63) Continuation of application No. 18/114,669, filed on Feb. 27, 2023, now Pat. No. 11,941,628, which is a
(Continued)

(51) Int. Cl.
*G06Q 20/40* (2012.01)
*G06Q 20/32* (2012.01)

(52) U.S. Cl.
CPC ....... *G06Q 20/401* (2013.01); *G06Q 20/3255* (2013.01)

(58) Field of Classification Search
CPC .................. G06Q 20/401; G06Q 20/3255
See application file for complete search history.

(56) References Cited

U.S. PATENT DOCUMENTS 6,954,740 B2  10/2005  Talker
7,966,489 B2   6/2011  Cam-Winget et al.
(Continued)

OTHER PUBLICATIONS

Bhatt et al., "Protect online facilities using User Authentication depend on Cloud." International Journal of Engineering and Innovative Technology (IJEIT) vol. 1, Issue 2, Feb. 2012. 4 pages.

*Primary Examiner* — Raven E Yono
(74) *Attorney, Agent, or Firm* — Foley & Lardner LLP

(57) ABSTRACT

A method includes conserving, responsive to receiving an indication that at least one selectable object is selected, computing resources; receiving a request to set the verification settings for a computing system, the verification settings comprising a threshold transaction amount; determining an alias account number for the transaction account; receiving a transaction request, the transaction request indicating the alias account number and a transaction involving the transaction account; implementing a verification policy based on the verification settings, comprising: determining a predetermined threshold of a monetary amount; determining a first policy monetary amount; comparing the first policy monetary amount to the predetermined threshold; determining that the first policy monetary amount does not meet the predetermined threshold; implementing a sub-policy; and generating and transmitting an electronic message comprising a selectable hyperlink generated for the transaction request; and responsive to determining that the selectable hyperlink was navigated, approving the transaction request.

20 Claims, 6 Drawing Sheets

Related U.S. Application Data continuation of application No. 16/010,302, filed on Jun. 15, 2018, now Pat. No. 11,593,801.

(56) References Cited

U.S. PATENT DOCUMENTS

| | | |
|---|---|---|
| 8,266,058 B1 | 9/2012 | Anderson |
| 8,869,241 B2 | 10/2014 | Davis et al. |
| 9,147,210 B2 | 9/2015 | Scipioni |
| 9,292,677 B2 | 3/2016 | Ranganathan et al. |
| 9,628,495 B2 | 4/2017 | Grigg et al. |
| 9,647,999 B2 | 5/2017 | Grigg et al. |
| 9,729,536 B2 | 8/2017 | Votaw et al. |
| 2001/0053685 A1 | 12/2001 | Mori et al. |
| 2007/0185820 A1 | 8/2007 | Talker |
| 2012/0030107 A1* | 2/2012 | Gibson .................. G06Q 20/10 705/43 |
| 2015/0006310 A1* | 1/2015 | Murugappan .......... G06Q 30/08 705/26.3 |
| 2015/0227924 A1 | 8/2015 | Grigg et al. |
| 2015/0278881 A1 | 10/2015 | Agrawal et al. |
| 2018/0032997 A1 | 2/2018 | Gordon et al. |

\* cited by examiner

400

Receiving a request to set respective verification settings for one or more processing entities, the request including account information 402

↓

Determining one or more alias account numbers for a financial account based on the account information, each alias account number corresponding to a respective one of the one or more processing entities 404

↓

Setting the respective verification settings for the one or more processing entities 406

↓

Receiving a transaction request from a second computing system, the transaction request indicating one of the one or more alias account numbers and specifying a transaction involving the transaction account 408

↓

Implementing a verification policy based on the verification settings corresponding to the one of the one or more alias account numbers 410

↓

Approving the transaction request, and 412

↓

Implementing the transaction involving the transaction account specified by the transaction request 414

FIG. 4

SYSTEMS AND METHODS FOR IMPROVED VERIFICATION OF TRANSACTIONS

CROSS-REFERENCE TO RELATED APPLICATIONS

This application is a continuation of U.S. patent application Ser. No. 18/114,669, filed Feb. 27, 2023, which is a continuation of U.S. patent application Ser. No. 16/010,302, filed Jun. 15, 2018, now U.S. Pat. No. 11,593,801, each of which are hereby incorporated by reference in their entireties and for all purposes.

TECHNICAL FIELD

Embodiments of the present disclosure relate generally to the field of verifying transactions.

BACKGROUND

Financial institutions may employ verification methods to verify requests for transactions received from financial entities or payment processors (e.g., payment aggregators).

Conventionally, some financial institutions apply a same set of verification settings regardless of which payment processor sent the request. However, payment processors may vary in terms of trustworthiness and security, or may be susceptible to fraudsters in certain ways. In particular, fraudsters may steal credentials which a customer uses to access an account held with a payment processor. The customer may store bank account information with the payment processor for ease of processing transactions. By accessing such credentials, fraudsters may perform transactions using a customer's stolen bank account information. To reduce the potential for fraudulent activity, customers may desire tailored security measures specific to certain payment processors.

SUMMARY

One example embodiment relates to a method. The method includes receiving, by a first computing system, a transaction request from a second computing system, the transaction request indicating a first account number that is an alias of a transaction account having a second account number, and specifying a transaction involving the transaction account. The method further includes determining, by the first computing system, the second account number by referencing a data structure that associates the first account number and the second account number, determining, by the first computing system, a verification policy associated with the second account number, and transmitting, by the first computing system, a verification challenge via a channel associated with the transaction account based on the verification policy. The method yet further includes receiving, by the first computing system, a response to the verification challenge, determining, by the first computing system, to authorize the transaction request based on the response to the verification challenge, and implementing, by the first computing system, the transaction involving the transaction account specified by the transaction request.

Another example embodiment relates to a method. The method includes receiving, by a first computing system from a client device, a request to set respective verification settings for one or more transaction processors, the request including account information, determining, by the first computing system, one or more alias account numbers for a transaction account based on the account information, each alias account number corresponding to a respective one of the one or more transaction processors, setting, by the first computing system, the respective verification settings for the one or more transaction processors, and receiving, by the first computing system, a transaction request from a second computing system, the transaction request indicating one of the one or more alias account numbers and specifying a transaction involving the transaction account. The method further includes implementing, by the first computing system, a verification policy based on the verification settings corresponding to the one of the one or more alias account numbers, approving, by the first computing system, the transaction request; and, implementing, by the first computing system, the specified transaction involving the transaction account.

Yet another example embodiment relates to a device. A device for implementing transactions includes a processing circuit including a processor and memory, the memory structured to store instructions that are executable by the processor and cause the processing circuit to transmit, by the device to a first computing system, a transaction request indicating a first account number that is an alias of a transaction account having a second account number, and specifying a transaction involving the transaction account. The instructions, when executed by the processing circuit, further cause the processing circuit to receive, by the device from a second computing system different from the first computing system, a verification challenge associated with verification settings for the first account number, transmit, by the device to the second computing system, a response to the verification challenge, and receive, by the device from the first computing system, an indication that the specified transaction involving the transaction account was approved.

Various objects, aspects, features, and advantages of the disclosure will be readily understood by referring to the detailed description taken in conjunction with the accompanying drawings, in which like reference characters identify corresponding elements throughout. In the drawings, like reference numbers generally indicate identical, functionally similar, and/or structurally similar elements.

BRIEF DESCRIPTION OF THE DRAWINGS

FIG. 4 is a flow diagram of a method of verifying a transaction, according to an example embodiment.

DETAILED DESCRIPTION

Figure 1:
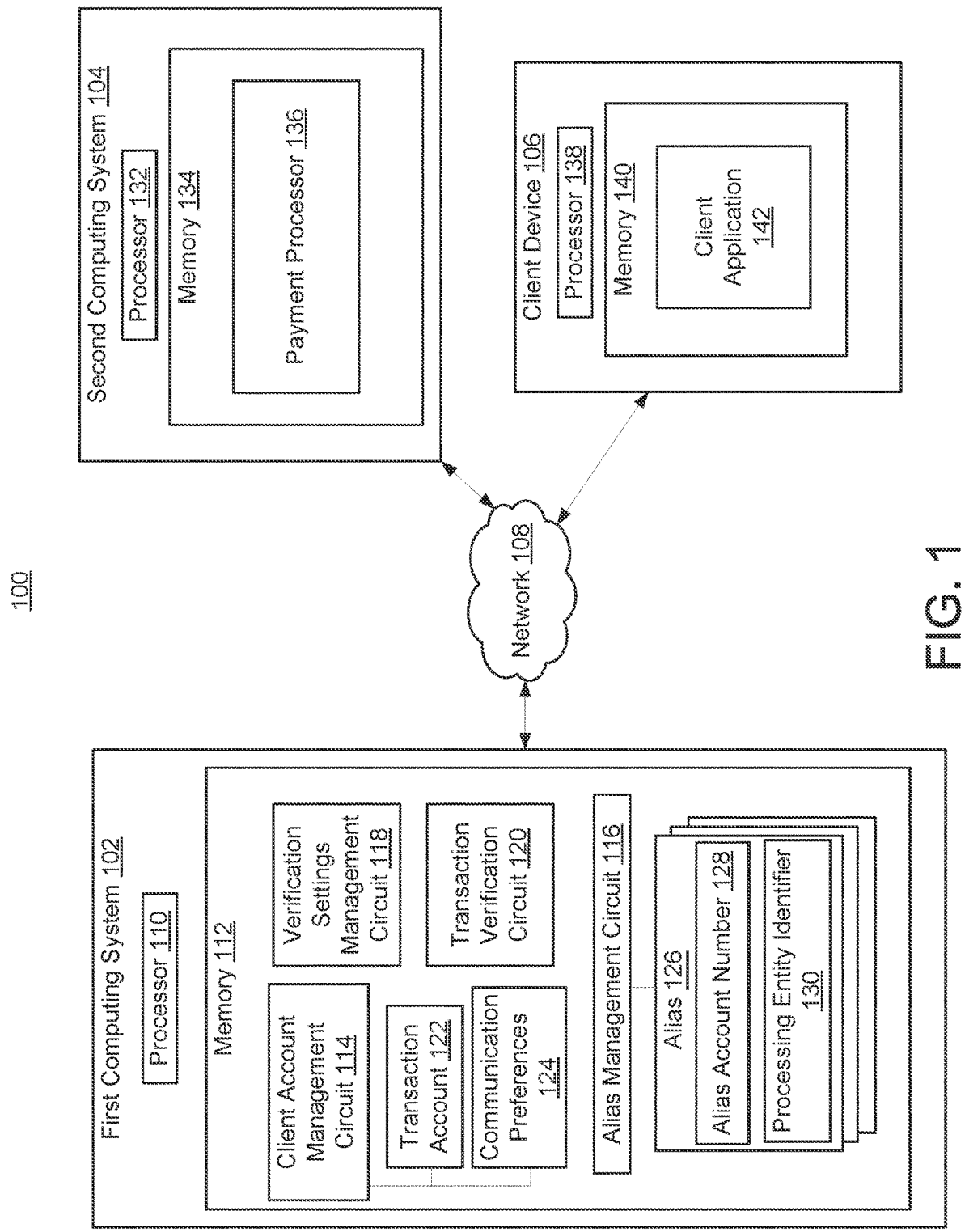
FIG. 1 is a schematic diagram of a verification system, according to an example embodiment.

Various systems, methods, and apparatuses for facilitating transactions are described herein. For example, the systems, methods, and apparatuses can protect sensitive information (such as an account number) by providing for use of an alias or dummy account number associated with an account held with a provider of financial services, such as a bank. The alias account number may be submitted to a third party payment processor for processing a payment transaction instead of directly providing the user account number. Thus, the third party payment processor need not (and may not) have access to a "true" (directly functional) account number. As used herein, a "true" account number refers to a traditional account number referencing a user's account at a financial institution, such as a checking or savings account number, or credit account number. Limiting the access of the third party payment processor helps to protect the account information in case information accessible to the third party payment processor is compromised (e.g., user payment processor credentials). A user may provide or set up credentials with the third party payment processor as part of creating an account. Conventionally, a user or client saves account information, such as an account number, relating to a bank account when creating his or her third party payment processor account (e.g., PayPal account) or submits a bank account number to the payment processor in order to effectuate a transaction (e.g. a financial transaction). Providing account information directly can potentially expose the user to significant risk. For example, the user's credentials may be stolen leading to the unauthorized dissemination of user account information or the user may be duped into providing the bank account number to a fraudulent party masquerading as a legitimate payment processor. The systems, methods, and apparatuses described herein improve on such conventional systems by exposing only the alias account number to the payment processor and keeping the true account number masked, thus providing better security for the user.

Furthermore, the systems, methods, and apparatuses can be used to facilitate improved verification of transactions (e.g., financial transactions, including payment transactions). The systems, methods, and apparatuses provide for setting verification policies specific to various third parties, including payment processors. The alias account number submitted to the payment processor may be associated with verification settings specific to the payment processor, such that a financial institution (e.g., a bank computing system) can use that association to implement a verification policy specific to the payment processor. The user may customize or optimize the verification settings for the respective payment processors. This can provide for setting higher or more demanding verification requirements for certain payment processors, and for setting lower or less demanding verification requirements for other payment processors (e.g., based on the user or the provider's assessment of the risk posed by use of the respective payment processors). In addition, the user may customize verification settings for each payee using a particular payment processor. Conventionally, a user is forced to use default verification settings for payment processors, or may be forced to use a same verification policy for all payment processors. The systems, methods, and apparatuses provided herein improve on such conventional systems by setting verification policies specific to alias account numbers associated with specific payment processors, thus providing for improved verification for the user that strikes an appropriate balance of convenience and security, on an individualized basis.

For example, a user may set a first verification policy for a trusted payment processor that involves little verification (e.g., may simply request that the user click a confirmation link to verify a transaction). This requires little processing (e.g., may involve verification that a click was performed via communication with a click server, and may omit computing steps involving verification of a password or other authentication process), and can help to conserve computer resources and to improve the user experience by providing a fast and efficient verification process that the user has deemed sufficient for the trusted payment processor. The user may select a second verification policy for a less trusted payment processor that involves more verification (e.g., may request that the user click a confirmation link to verify a transaction and input a password). This provides for improved security when using the less trusted payment processor. The system or method thus conserves computer resources by minimizing processing required for trusted payment processors, while ensuring that sufficient security protocols are followed for less trusted payment processors. The user experience is correspondingly improved by implementing a fast and readily navigated verification process (e.g., a one-click process) for trusted payment processors, and implementing a more secure verification process for less trusted payment processors.

Referring now to FIG. 1, an illustration of a verification system 100 is shown according to an example embodiment. The verification system 100 can be implemented to facilitate improved verification of transactions using an alias account number for masking a true account number, and for implementing a verification policy specific to a payment processor. The verification system 100 includes a first computing system 102, a second computing system 104, a client device 106, and a network 108. In some embodiments, the client device 106 may submit a transaction request to the second computing system (e.g. a computing system of a payment processor) using an alias account number, and the second computing system 104 may forward the transaction request to the first computing system 102. The first computing system 102 may then implement a verification policy specific to the alias account number.

The first computing system 102 may include a computing system of a processing entity (e.g., a processing entity, such as a payment aggregator). The first computing system 102 may include a processor 110, and a memory 112. The processor 110 may include one or more microprocessors, application-specific integrated circuits (ASIC), a field-programmable gate arrays (FPGA), etc., or combinations thereof. The memory 112 may include, but is not limited to, electronic, magnetic, or any other storage or transmission device capable of providing the processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which the processor can read instructions. The memory 112 may include components, subsystems, data structures, modules, scripts, applications, or one or more sets of processor-executable instructions for implementing management of a transaction account (e.g. a transaction account, such as a checking account, credit account, or savings account), including any processes described herein. For example, the memory 112 may include a client account management circuit 114, an alias management circuit 116, a verification settings management circuit 118, and a transaction verification circuit 120.

The client account management circuit 114 may access a database or other data structure including information pertinent to a client, user, or customer's account. For example, the client account may access a client profile for a financial institution operating the first computing system 102. The client account management circuit 114 access one or more transaction accounts, and may include one or more online accounts (e.g., an account usable for an online banking experience provided by, or facilitated by, the financial institution). The client account management circuit 114 may access a transaction account 122, and may access communication preferences 124.

The transaction account 122 may include a bank account, a checking or savings account, a credit account, or other transaction account. The transaction account may be associated with a transaction account number (e.g., a "true" transaction account number that is directly functional for identifying the transaction account), and may be associated with one or more aliases 126, discussed in more detail below with regard to the alias management circuit 116. The communication preferences 124 may include information relating to policies for contacting the client, such as, for example, contact information, a preferred contact channel (e.g., e-mail, phone call, letter, short message service (SMS) message, push notification, or other contact channel), or a contact policy (e.g., specifying when and how contact with the customer should be made).

The alias management circuit 116 may include components, subsystems, data structures, modules, scripts, applications, or one or more sets of processor-executable instructions for managing and/or generating aliases of transaction accounts. The alias manager can generate one or more aliases 126, including an alias 126, corresponding to a transaction account (e.g., to the transaction account 122 managed by the client account management circuit 114). The alias 126 can access an alias account number 128 and a processing entity identifier 130.

The alias account number 128 can be a dummy account number that does not provide direct access to the transaction account 122. The term "account number," as used herein, is not restricted to numeric sequences, and may include, for example, a sequence including any type of character, such as a numeric, alpha-numeric, or symbolic character. The alias account number 128 may include, for example, a sequence of characters (e.g., a numeric or alpha numeric sequence or string), and may be associated with the transaction account 122. For example, the alias management circuit 116 may include, or may be configured to access, a data structure that associates any of the alias account number 128, the transaction account 122, and an account number of the transaction account 122. The alias management circuit 116 may generate the alias account number 128 such that the alias account number 128 has a format similar to, or the same as, a format of the transaction account number, and/or may include one or more characters identical to one or more corresponding characters of the transaction account number (e.g., in a same position in the account number character sequences). For example, the alias management circuit 116 may generate the alias account number 128 such that the alias account number 128 has a same number of characters as the transaction account number. In some embodiments, the alias management circuit 116 may generate the alias 126 such that the alias 126 includes a user selected alias (e.g., according to a user selection received, directly or indirectly, from the client device 106). The alias management circuit 116 may generate the alias 126 such that the alias 126 follows a different format than a format of the transaction account 122.

The alias management circuit 116 may generate the alias 126 such that the alias 126 includes, or references, one or more processing entity identifiers 130. A processing entity identifier 130 may identify a processing entity (such as a payment aggregator or other payment processor) corresponding to the alias 126. Thus, the alias 126 may be specific to one or more financial entities. By implementing a plurality of aliases 126 and a plurality of processing entity identifiers, a user may be protected in the event that any individual alias 126 is compromised, as in such a scenario, only the individual alias is compromised. Furthermore, the one or more processing entity identifiers 130 may be used to associate the alias 126 with verification settings defining one or more verification policies managed by the verification settings management circuit 118. Thus, a user may customize or optimize the verification settings for one or more processing entity identified by the processing entity identifiers 130. For example, the user can set higher or more demanding verification requirements for certain payment processors, and can set lower or less demanding verification requirements for other payment processors (e.g., based on the user's assessment of the risk posed by use of the respective payment processors).

The verification settings management circuit 118 may include components, subsystems, data structures, modules, scripts, applications, or one or more sets of processor-executable instructions for managing and/or generating verification settings and policies. The verification settings management circuit 118 may include, or may be configured to access, a data structure that associates an alias 126 (or an alias account number or processing entity identifier thereof) and a verification policy. The verification settings management circuit 118 may determine verification settings that define one or more verification policies for transactions (e.g., transactions involving the transaction account 122). The verification settings management circuit 118 may determine the verification settings based on user inputs received, directly or indirectly, from the client device 106. For example, the verification settings management circuit 118 may receive the user inputs via a website accessed by the client device 106, or by an application (e.g., a mobile application, such as a banking application) executed by the client device 106. The verification settings management circuit 118 may generate one or more verification polices based on the determined verification settings, and may associate the verification policies with the aliases 126. In some embodiments, the verification settings management circuit 118 may associate a default verification policy with the alias 126. In some embodiments, the verification settings management circuit 118 may update the default verification policy or replace the default verification policy with another verification policy, responsive to receiving a user selection of one or more verification settings.

In some embodiments, the verification settings management circuit 118 may determine a plurality of verification policies for a corresponding plurality of aliases 126. At least two of the plurality of verification policies determined by the verification settings management circuit 118 may differ from each other. In some embodiments, the plurality of aliases 126 include, or are associated with, a same transaction account (e.g., the transaction account 122), and may include, or be associated with, different processing entity identifiers 130. Thus, for a same transaction account, different verification policies may apply for different financial entities. This can provide for a user selecting appropriate verification settings for each processing entity. In some embodiments, the verification settings management circuit 118 can access or receive a user input (e.g., from the client device 106) indicating verification settings and a set financial entities for which the verification settings are to apply, and the verification settings management circuit 118 can responsively determine a same verification policy for a plurality of aliases corresponding to the plurality of financial entities (e.g., including corresponding processing entity identifiers 130). Thus, a user can readily set a preferred set of verification settings for a plurality of financial entities, without having to set the verification settings for each processing entity individually, which can be burdensome to the user.

The transaction verification circuit 120 may include components, subsystems, data structures, modules, scripts, applications, or one or more sets of processor-executable instructions for verifying and/or implementing transactions. The transactions may be financial transactions, and may involve the transaction account 122, and may include, for example, a deposit or a withdrawal of money or credit to or from the transaction account 122. In some embodiments, the transaction verification circuit 120 may verify a transaction requested by a user via the second computing system 104. For example, the second computing system 104 may be operated by a payment processor (e.g., a payment aggregator) or a financial service provider, and the transaction may be a payment transaction processed by the payment processor. The first computing system 102 may receive a request for a transaction from the second computing system 104 and may process the request, and the transaction verification circuit 120 may implement at least a portion of the processing of the request.

The request may include an alias account number 128 associated with the transaction account 122. For example, the client device 106 may implement a transaction via the second computing system 104 using the alias account number 128 (e.g., a user may submit a payment request to a payment processor using the alias account number), and the second computing system 104 may transmit a request for a transaction to the first computing system 102, the request including the alias account number 128. Thus, the second computing system 104 need not obtain access to the account number of the transaction account 122, thereby protecting the security of the transaction account 122. The transaction verification circuit 120 may receive the request including the alias account number 128, and may reference one or more verification policies associated with the alias account number 128.

The transaction verification circuit 120 may implement the referenced one or more verification policies associated with the alias account number 128. A verification policy may specify a method of verifying whether a transaction is authorized (e.g., whether a transaction involving the transaction account 122 is authorized). The verification policy may specify transmitting one or more verification challenges to verify that the transaction is authorized, and may provide for authorizing the transaction responsive to the verification challenge being appropriately answered or responded to. In some embodiments, a verification challenge may include a message requesting confirmation of authorization for the transaction being sent (e.g., according to the communication preferences 124), and a corresponding response may include the transaction verification circuit 120 receiving the requested confirmation. For example, an e-mail or SMS message including a hyperlink may be transmitted to a user requesting that the hyperlink be clicked to confirm that the transactions authorized. In some embodiments, a verification challenge may be a message including a security question, or a request for a password or confirmation code (e.g., a confirmation code sent in parallel with the verification challenge), and a response to the verification challenge may include the transaction verification circuit 120 receiving an answer to the security question, receiving the password, or receiving the confirmation code.

In some embodiments, the transaction verification circuit 120 may determine that a verification policy including two or more sub-policies is associated with the received alias account number, and the transaction verification circuit 120 may determine which sub-policy to implement. The verification policy may specify that a first sub-policy is to be implemented if one or more specifications are met, and that a second sub-policy is to be implemented if the one or more specifications are not met. For example, the verification policy may specify that the first sub-policy is to be implemented if the requested transaction involves a monetary amount equal to or larger than a predetermined threshold amount, and that the second sub-policy is to be implemented if the requested transaction involves a monetary amount smaller than the predetermined threshold amount. Thus, different policies may be implemented as appropriate for the requested transaction. For example, the first sub-policy may include higher or more demanding verification requirements than the second sub-policy (e.g., the first sub-policy may include one or more verification challenges, and the second sub-policy may include less (e.g., zero) verification challenges). Thus, verification of the transaction may be made easier or may be omitted for small transactions, which can be convenient to a user, while verification of larger transactions can still be implemented.

In some embodiments, the transaction verification circuit 120 may transmit the verification challenge to the second computing system 104 (e.g., for forwarding to the client device 106), and may receive a response to the verification challenge. In some embodiments, the transaction verification circuit 120 is configured to transmit the verification challenge to the client device 106 directly, or to a device, account, or address (e.g., e-mail address) accessed by the client account management circuit 114 or included in the communication preferences 124. Such a configuration may advantageously provide for the second computing system 104 implementing a role in the improved verification systems and methods described herein without needing to be reconfigured to process user selected, or payment processor specific, verification policies.

The second computing system 104 may include a computing system of a payment processor (e.g., may be a payment aggregator computing system). The second computing system 104 may include a processor 132, and a memory 134. The processor 132 may include one or more microprocessors, application-specific integrated circuits (ASIC), a field-programmable gate arrays (FPGA), etc., or combinations thereof. The memory 134 may include, but is not limited to, electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which processor can read instructions. The memory 134 may include components, subsystems, data structures, modules, scripts, applications, or one or more sets of processor-executable instructions for implementing management of a transaction account, including any processes described herein. For example, the memory 134 may include a payment processor 136.

The payment processor 136 may include components, subsystems, data structures, modules, scripts, applications, or one or more sets of processor-executable instructions for verifying and/or implementing transactions. For example, the payment processor 136 may be configured to process an online payment, or a payment made at a merchant device. The payment processor 136 may receive a request from a client device (e.g., the client device 106) for a transaction, such as a payment transaction. The request may include an account number. In some embodiments, the request includes the alias account number 128. The payment processor 136 may process the request including, for example, identifying a financial institution corresponding to the request, and may transmit the request (or may transmit a new request based on the request) to the financial institution. The payment processor 136 may transmit a request to the first computing system 102 to implement a transaction. The request may include the alias account number 128, and may include instructions or parameters pertaining to the requested transaction. Thus, the request including the alias account number 128 may be transmitted to the first computing system 102 without the payment processor 136 (or the second computing system 104) having access to the account number for the transaction account 122 associated with the alias account number 128. Thus, if the second computing system 104 is compromised, only the alias account number 128 is exposed and the security of the transaction account 122 is protected.

The payment processor 136 may provide for one or more verification processes, including verification according to verifications policies implemented by the transaction verification circuit 120. For example, the payment processor 136 may provide for "in-band" verification by receiving a verification challenge from the transaction verification circuit 120. The payment processor 136 may forward the verification challenge to the client device 106. The payment processor 136 may receive a response to the verification challenge from the client device 106, and may forward the response to the transaction verification circuit 120. In some embodiments, the verification implemented by the transaction verification circuit 120 may be performed "out-of-band" with respect to the second computing system 104, and the transaction verification circuit 120 may transmit the verification challenge to the client device 106 via a channel that does not include the second computing system 104. In such embodiments, from the point of view of the second computing system 104, the overall transaction process may seem similar or identical to a transaction process that does not involve an alias account number and a payment processor specific verification (e.g., the same or similar processes are executed by the second computing system 104 as would be the case if a true account number were used). In some embodiments, the payment processor 136 may implement verifications policies different than policies implemented by the transaction verification circuit 120 (e.g., in addition to the policies implemented by the transaction verification circuit 120).

The client device 106 be any computing device (e.g., a mobile device, a laptop device, a tablet device, or any other computing device). The client device 106 can include a plurality of devices. The client device 106 can include one or more devices accessed by the client account management circuit 114. The client device 106 may include a processor 138, and a memory 140. The processor 138 may include one or more microprocessors, application-specific integrated circuits (ASIC), a field-programmable gate arrays (FPGA), etc., or combinations thereof. The memory 140 may include, but is not limited to, electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which processor can read instructions. The memory 140 may include components, subsystems, data structures, modules, scripts, applications, or one or more sets of processor-executable instructions for implementing management of a transaction account, including any processes described herein. For example, the memory 140 may include a client application 142.

The client application 142 may include components, subsystems, data structures, modules, scripts, applications, or one or more sets of processor-executable instructions for implementing a transaction, such as a payment transaction or other transaction. The client application 142 may include, for example, a web browser. The client application 142 may include, for example, a mobile application. The client application 142 may be configured to transmit a request for a transaction (e.g., a financial transaction), the request including transaction information and an account number (e.g., the alias account number 128). The client application 142, or another application executed by the client device 106, may be configured to receive a verification challenge (e.g., from the transaction verification circuit 120 or from the payment processor 136), and may be configured to transmit a response to the verification challenge (e.g., to the transaction verification circuit 120 or to the payment processor 136).

The client application 142, or another application executed by the client device 106, may be configured to provide a graphical user interface (GUI), such as the GUI 802 described below with respect to FIG. 6. As described in more detail below, the GUI 802 may provide an interface for setting verification settings (e.g., for transmitting instruction to the verification settings management circuit 118).

The network 108 provides communicable and operative coupling between the first computing system 102, the second computing system 104, the client device 106, and other components disclosed and described herein to provide and facilitate the exchange of communications (e.g., data, instructions, requests, messages, values, commands). Accordingly, the network 108 may include any network including wired (e.g., Ethernet) and/or wireless networks (e.g., 802.11X, ZigBee, Bluetooth, WiFi). In some embodiments, the network 108 includes the Internet. In further embodiments, the network 108 includes a proprietary banking network to provide secure or substantially secure communications.

Figure 2:
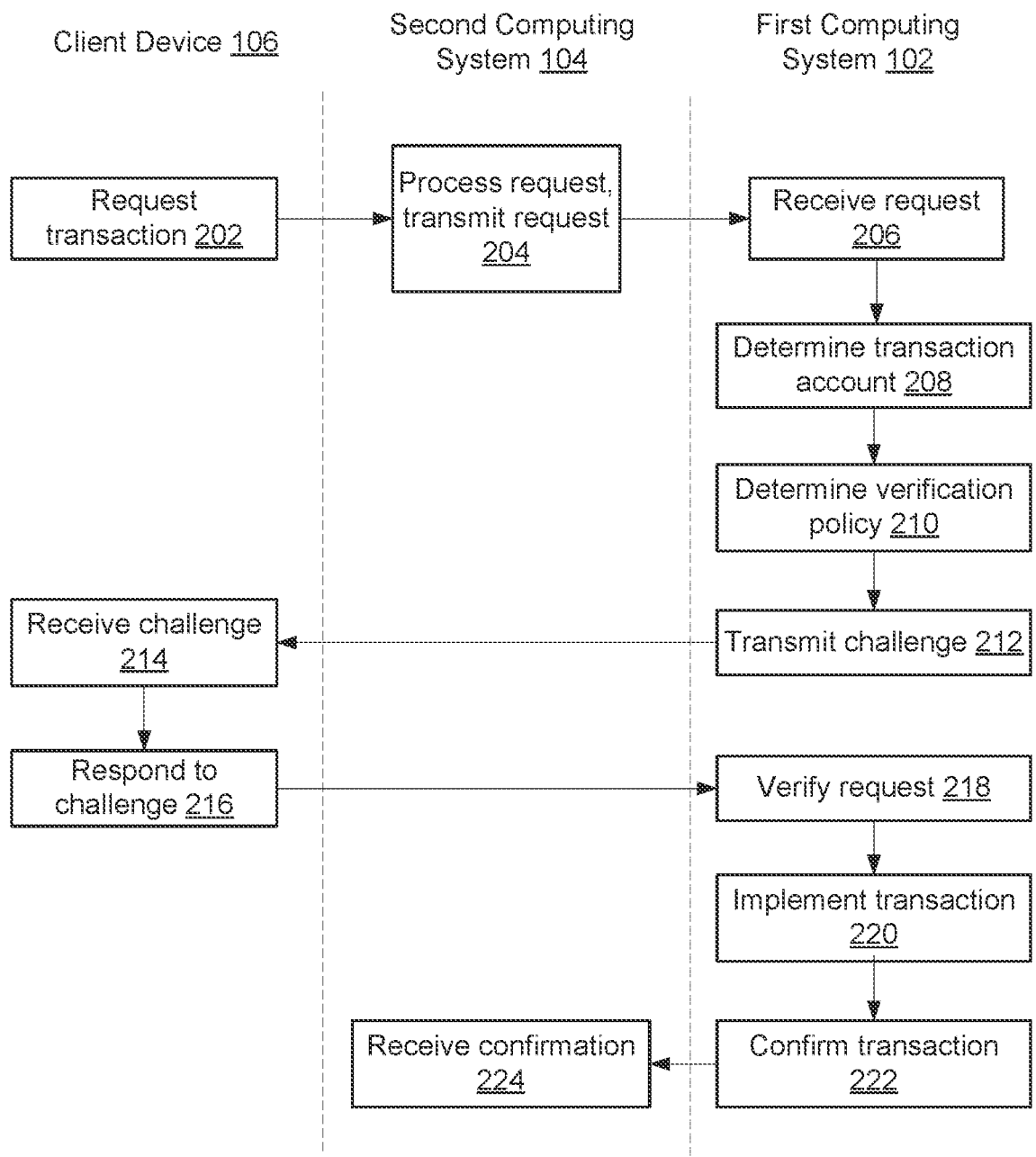
FIG. 2 is a flow diagram of a method of verifying a transaction, according to an example embodiment.

Referring now to FIG. 2, FIG. 2 shows an example method of verifying a transaction, according to an embodiment. The method includes blocks 202 through 224. In a brief overview, at block 202, the client device 106 transmits a transaction request. At block 204, the second computing system 104 processes the request, and transmits a request to the first computing system 102. At block 206, the first computing system 102 receives the request. At block 208, the first computing system 102 determines a transaction account based on the request. At block 210, the first computing system 102 determines a verification policy based on the request. At block 212, the first computing system 102 transmits a verification challenge. At block 214, the client device 106 receives the verification challenge. At block 216, the client device 106 responds to the verification challenge. At block 218, the first computing system 102 verifies the transaction request based on the response to the verification challenge. At block 220, the first computing system 102 implements the requested transaction. At block 222, the first computing system 102 transmits confirmation that the requested transaction has been, or will be, implemented. At block 224, the second computing system 104 receives the confirmation.

In more detail, at block 202, the client device 106 transmits a transaction request. The transaction request may include transaction information (e.g., specifying payment of a specified amount of money). The transaction request may include an alias account number associated with a transaction account, such as the alias account number 128 associated with the transaction account 122.

At block 204, the second computing system 104 receives the request from the client device 106, processes the request, and transmits a request to the first computing system 102. The second computing system 104 may process the request to determine a financial institution identified by the request, and may forward the request (or transmit another request based on the request received from the client device 106) including the alias account number 128 to the first computing system 102. Thus, the second computing system 104 may transmit a transaction request to the first computing system 102 without having access to the account number of the transaction account 122.

At blocks 206 through 210, the first computing system 102 may receive the transaction request including the alias account number 128. The first computing system 102 may determine that the alias account number 128 is associated with the alias 126 and, thereby, a processing entity identified by the processing entity identifier 130. The first computing system 102 may determine that the transaction account 122 is associated with the alias 126. The first computing system 102 may determine a corresponding verification policy corresponding to the identified alias 126, and/or to the identified corresponding processing entity. In accordance with the determined verification policy, the first computing system 102 may transmit a verification challenge "out-of-band" to the client device 106. In some embodiments, the first computing system 102 may transmit the verification challenge "in-band" to the second computing system 104. The first computing system 102 may transmit the verification challenge in accordance with the communication preferences 124 accessed by the client account management circuit 114.

At blocks 214 and 216, the client device 106 may receive the verification challenge and may respond to, or answer, the verification challenge. In some embodiments, the verification challenge may be received by the client device by a channel specified by the communication preferences 124 accessed by the client account management circuit 114. In some embodiments, the verification challenge may include a message requesting confirmation of authorization for the requested transaction. For example, an e-mail or SMS message including a hyperlink may be transmitted to a user of the client device 106 requesting that the hyperlink be clicked to confirm that the transactions authorized. In some embodiments, a verification challenge may be a message including a security question, or a request for a password or confirmation code (e.g., a confirmation code sent in parallel with the verification challenge), and the client device 106 may transmit a response (e.g., an answer to the security question, the password, or the confirmation code) to the first computing system 102.

At blocks 218-222, the first computing system 102 may receive the response to the verification challenge, and may verify the response (e.g., by matching the response to one or more predetermined answers to the verification response). The first computing system 102 may implement the requested transaction (e.g., by debiting or crediting the transaction account 122). The first computing system 102 may transmit confirmation that the transaction has been implemented to the second computing system 104 and/or to the client device 106.

At block 224, the second computing system 104 may receive the confirmation that the transaction has been implemented from the first computing system 102. The second computing system 104 may forward the confirmation to the client device 106.

Figure 3:
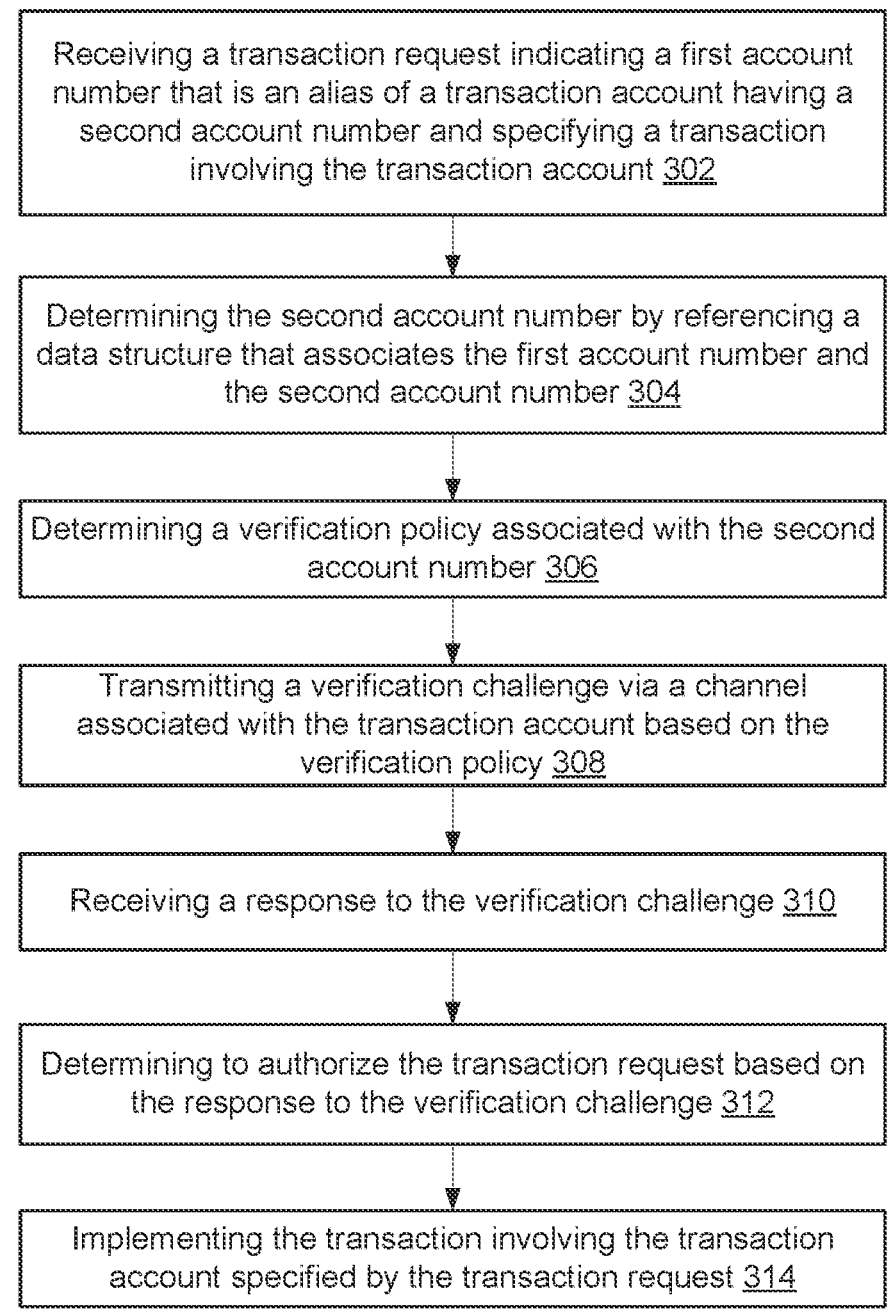
FIG. 3 is a flow diagram of a method of verifying a transaction, according to an example embodiment.

Referring now to FIG. 3, FIG. 3 shows an example method 300 for verifying a transaction, according to an embodiment. The method includes blocks 302 through 314. In a brief overview, at block 302, the first computing system 102 receives a transaction request indicating a first account number that is an alias of a transaction account having a second account number and specifying a transaction involving the transaction account. At block 304, the first computing system determines the second account number by referencing a data structure that associates the first account number and the second account number. At block 306, the first computing system determines a verification policy associated with the second account number. At block 308, the first computing system transmits a verification challenge via a channel associated with a transaction account based on the verification policy. At block 310, the first computing system receives a response to the verification challenge. At block 312, the first computing system determines to authorize the transaction request based on the response to the verification challenge. At block 314, the first computing system implements the transaction involving the transaction account specified by the transaction request.

In more detail, at blocks 302 and 304, the first computing system 102 receives a transaction request indicating a first account number that is an alias of a transaction account having a second account number and specifying a transaction involving the transaction account, and further determines the second account number by referencing a data structure that associates the first account number and the second account number. For example, the alias management circuit 116 may include, or may be configured to access, a data structure that associates any of the alias account number 128, the transaction account 122, and an account number of the transaction account 122. The data structure may be accessed by the client account management circuit 114, or may include the aliases 126 managed by the alias management circuit 116.

At block 306, the first computing system 102 determines a verification policy associated with the second account number. The transaction verification circuit 120 may identify a verification policy generated by the verification settings management circuit 118 as the verification policy associated with the second account number. In some embodiments, the transaction verification circuit 120 may identify two or more sub-policies are associated with the received alias account number, and the transaction verification circuit 120 may determine which sub-policy to implement. The verification policy may specify that a first sub-policy is to be implemented if one or more specifications are met, and that a second sub-policy is to be implemented if the one or more specifications are not met. For example, the verification policy may specify that the first sub-policy is to be implemented if the requested transaction involves a monetary amount equal to or larger than a predetermined threshold amount, and that the second sub-policy is to be implemented if the requested transaction involves a monetary amount smaller than the predetermined threshold amount. Thus, different policies may be implemented as appropriate for the requested transaction. For example, the first sub-policy may include higher or more demanding verification requirements than the second sub-policy (e.g., the first sub-policy may include one or more verification challenges, and the second sub-policy may include less (e.g., zero) verification challenges). Thus, verification of the transaction may be made easier or may be omitted for small transactions, which can be convenient to a user, while verification of larger transactions can still be implemented.

At blocks 308 and 310, the first computing system 102 transmits a verification challenge to the client device 106 via a channel associated with the transaction account 122 based on the verification policy and receives a response to the verification challenge. A verification challenge may include a message requesting confirmation of authorization for the transaction being sent (e.g., according to the communication preferences 124), and a corresponding response may include the transaction verification circuit 120 receiving the requested confirmation. For example, an e-mail or SMS message including a hyperlink may be transmitted to a user requesting that the hyperlink be clicked to confirm that the transactions authorized. In some embodiments, a verification challenge may be a message including a security question, or a request for a password or confirmation code (e.g., a confirmation code sent in parallel with the verification challenge), and a response to the verification challenge may include the transaction verification circuit 120 receiving an answer to the security question, receiving the password, or receiving the confirmation code.

At blocks 312 and 314, the first computing system 102 determines to authorize the transaction request based on the response to the verification challenge, and implements the transaction involving the transaction account specified by the transaction request. The first computing system may verify the response to the verification challenge by matching the response to one or more predetermined answers to the verification response, or by receiving an indication that a hyperlink has been clicked (e.g., via notification from a click server). The first computing system 102 may responsively implement the requested transaction by debiting or crediting the transaction account 122.

Referring now to FIG. 4, FIG. 4 shows an example method 400 for verifying a transaction, according to an embodiment. The method includes blocks 402 through 414. In a brief overview, at block 402, the first computing system 102 receives a request to set respective verification settings for one or more transaction processors (e.g. financial entities, such as payment aggregators, the request including account information. At block 404, the first computing system 102 determines one or more alias account numbers for a transaction account based on the account information, each alias account number corresponding to a respective one of the one or more transaction processors. At block 406, the first computing system 102 sets the respective verification settings for the one or more transaction processors. At block 408, the first computing system receives a transaction request from a second computing system, the transaction request indicating one of the one or more alias account numbers and specifying a transaction involving the transaction account. At block 410, the first computing system 102 implements a verification policy based on the verification settings corresponding to the one of the one or more alias account numbers. At block 412, the first computing system 102 approves the transaction request. At block 414, the first computing system 102 implements the transaction involving the transaction account specified by the transaction request.

In more detail, at block 402, the first computing system 102 receives a request to set respective verification settings for one or more transaction processors, the request including account information (e.g., an identifier for an account managed by the client account management circuit 114). For example, the first computing system receives a request to set verification settings from the client device 106 via a GUI 802 (discussed in more detail below). The verification settings may include, for example, a verification question, an answer or response to the verification question, and/or a verification threshold below which a first verification policy is implemented, and at which or above which a second verification policy is implemented. The verification settings may include communication preferences, and the first computing system 102 may generate or update the communication preferences 124 accordingly.

At blocks 404 and 406, the first computing system 102 determines one or more alias account numbers 128 for the transaction account 122 based on the account information, each alias account number 128 corresponding to a respective one of the one or more transaction processors, and sets the respective verification settings for the one or more transaction processors. The verification settings management circuit 118 can determine a set financial entities for which the verification settings are to apply, and the verification settings management circuit 118 can responsively determine a same verification policy for a plurality of aliases corresponding to the plurality of financial entities (e.g., including corresponding processing entity identifiers 130). Thus, a user can readily set a preferred set of verification settings for a plurality of financial entities, without having to set the verification settings for each processing entity individually, which can be burdensome to the user.

At blocks 408 and 410, the first computing system 102 receives a transaction request from the second computing system 104, the transaction request indicating one of the one or more alias account numbers 128 and specifying a transaction involving the transaction account 122, and implements a verification policy based on the verification settings corresponding to the one of the one or more alias account numbers. For example, the first computing system 102 may implement blocks 302-310 of the method 300 described above, including determining the account number for the transaction account 122 based on the received alias account number 218, determining a corresponding verification policy based on the alias account number 218, implementing the corresponding verification policy by performing operations that include transmitting a verification challenge, and receiving a response to the verification challenge.

At blocks 412 and 414, the first computing system 102 approves the transaction request and implements the transaction involving the transaction account specified by the transaction request. For example the first computing system may determine that the received response to the verification challenge is correct, and may responsively debit or credit the transaction account 122 in accordance with the requested transaction. The first computing system 102 may further send confirmation of that the transaction was implemented to the second computing system 104 and/or the client device 106.

Figure 5:
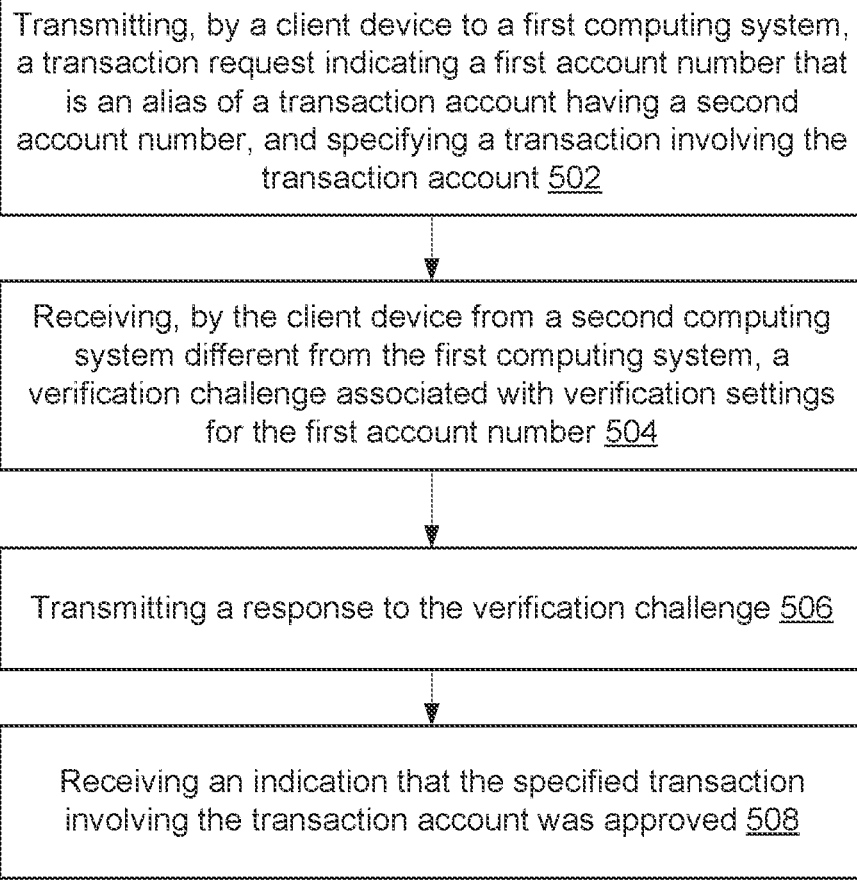
FIG. 5 is a flow diagram of a method of verifying a transaction, according to an example embodiment.

Referring now to FIG. 5, FIG. 5 shows an example method 500 for verifying a transaction, according to an embodiment. The method includes blocks 502 through 508. In a brief overview, at block 502, the client device 106 transmits, to a first computing system, a transaction request indicating a first account number that is an alias of a transaction account having a second account number, and specifying a transaction involving the transaction account. At block 504, the client device 106 receives, from a second computing system different from the first computing system, a verification challenge associated with verification settings for the first account number. At block 506, the client device 106 transmits a response to the verification challenge. At block 508, the client device 106 receives an indication that the specified transaction involving the transaction account was approved.

In more detail, at block 502, the client device 106 transmits, to the second computing system 104, a transaction request indicating an alias account number 128 of the transaction account 122 having a transaction account number. The transaction specifies a transaction involving the transaction account 122. The specified transaction may include, for example, a request to effectuate a payment (e.g., for an online purchase or to pay a bill). The client device 106 may implement the request using a GUI 802 provided by the client application 142 executing on the client device 106. The client device 106 may transmit the request as part of a payment transaction through a payment processor, such as a payment aggregator.

At block 504, the client device 106 receives, from the first computing system 102 (different from the second computing system 104), a verification challenge associated with verification settings for the alias account number 128. The verification challenge may be specified by verification settings specific to the alias account number 128, which in turn may be specific to the payment processor identified by the processing entity identifier 130. The client device 106 may receive the verification challenge from the first computing system 102 as part of an "out-of-band" verification process that does not involve the second computing system 104 receiving or transmitting the verification challenge. For example, the transaction verification circuit 120 of the first computing system 102 may transmit the verification challenge to the client device 106 via a channel that does not include the second computing system 104. In such embodiments, from the point of view of the second computing system 104, the overall transaction process may seem similar or identical to a transaction process that does not involve an alias account number and a payment processor specific verification (e.g., the same or similar processes are executed by the second computing system 104 as would be the case if a true account number were used).

At blocks 506 and 508, the client device 106 transmits a response to the verification challenge, and receives an indication that the specified transaction involving the transaction account was approved. In some embodiments, the client device 106 transmits a response to the verification challenge to the first computing system 102. In some embodiments, the client device 106 receives the indication that the specified transaction involving the transaction account was approved from the first computing system 102 or from the second computing system 104. The indication that the specified transaction involving the transaction account was approved may be displayed via the GUI 802 executed by the client device 106.

Figure 6:
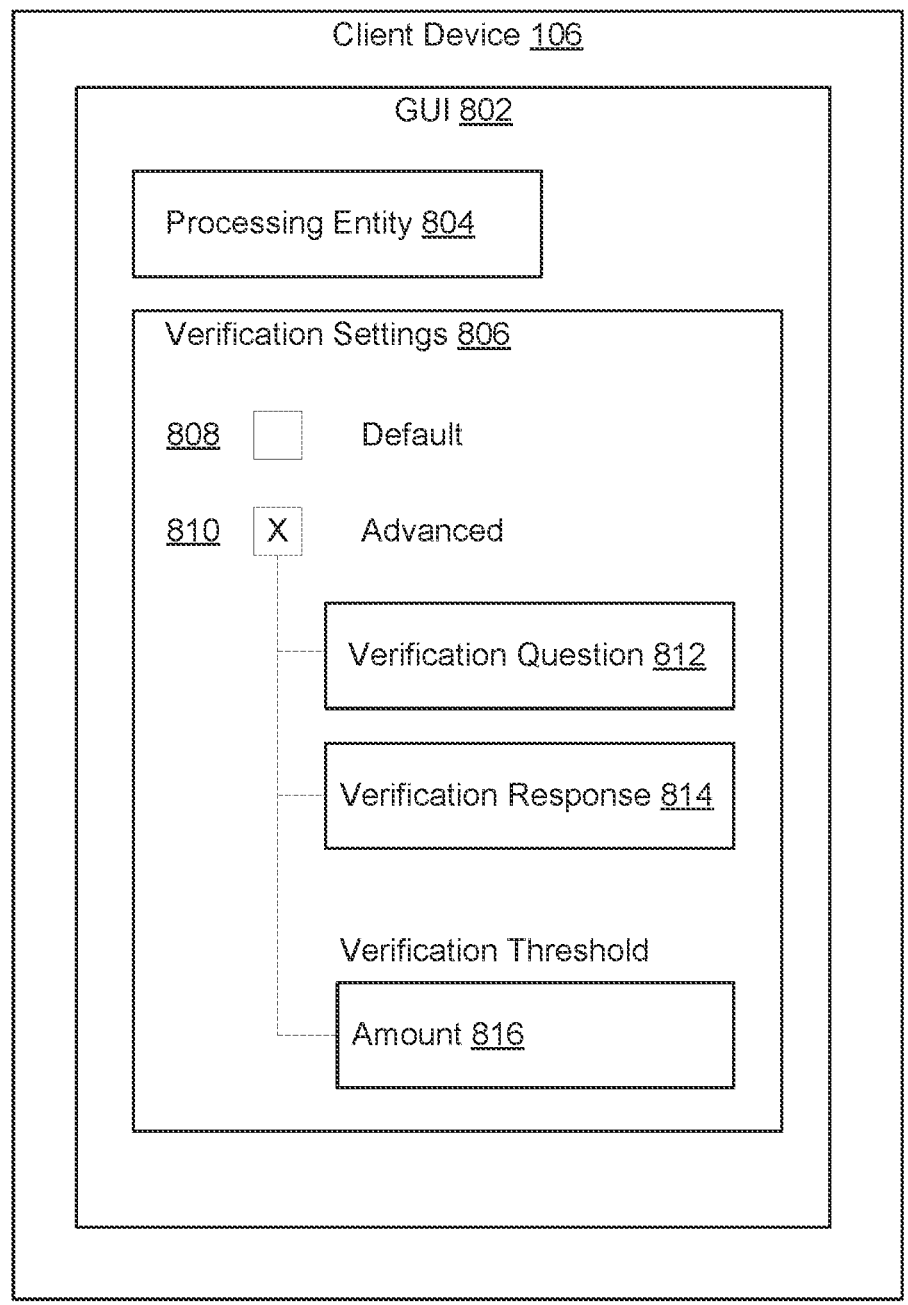
FIG. 6 is a user interface for setting verification settings, according to an example embodiment.

Referring now to FIG. 6, FIG. 6 shows a user interface for setting verification settings, according to an example embodiment. FIG. 6 shows a GUI 802 executed by the client device 106 and, for example, displayed on a screen or display of (or connected to) the client device 106. The GUI 802 may include one or more fields for setting verification settings. For example, the GUI 802 may include a processing entity field 804, and a verification settings space 806 that includes a plurality of fields and/or selectable objects.

The processing entity field 804 may provide for writing or selecting (e.g., from a dropdown menu) a particular processing entity. Thus, verification settings can be selected for the processing entity. The processing entity may include a plurality of financial entities (e.g., a set of payment processors or banks), such that a user of the GUI 802 may set verification settings for one or more entire categories of processing entity.

The verification settings space 806 includes a plurality of fields and/or selectable objects that provide for selecting verification settings for the processing entity (or financial entities) identified in the processing entity field 804, including a selectable "default" object 808 (e.g., a clickable box) and a selectable "advanced" object 810 (e.g., a clickable box). The selectable "advanced" object 810, when clicked, may open a plurality of fields, including a verification question field 812, a verification response field 814, and a verification threshold amount field 816. The user may thus employ the GUI 802 to select default verification settings (e.g., a set of predetermined verification settings), or may select an advanced option to customize the verification settings. The verification question field 812 may for example, allow a user to enter text that serves as a verification question, or may allow a user to select a verification question from a dropdown menu. The verification response field 814 may for example, allow a user to enter text that serves as a response or answer to the verification question. The verification threshold amount field 816 may be optional, and may permit a user of the GUI 802 to set a threshold for implementing a verification policy (e.g., a policy employing the verification question and response). For example, a first verification policy (or sub-policy) may be implemented if the requested transaction involves a monetary amount equal to or larger than the amount specified in the verification threshold amount field 816, and a second verification policy (or sub-policy) may be implemented if the requested transaction involves a monetary amount smaller than the monetary amount specified in the verification threshold amount field 816. Thus, different policies may be implemented as appropriate for the transactions involving the processing entity identified in the processing entity field 804.

Thus, the GUI 802 provides for readily setting verification settings specific to a processing entity in a user-friendly manner. By employing the features shown in FIG. 6 and described above, a user may conveniently set verification settings without having to laboriously flip back and forth through multiple pages of a website, and the user may set the verification policies specific to particular financial entities, thus providing for customized and improved security.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

In embodiments described herein, one or more processors may execute instructions stored in memory or may execute instructions otherwise accessible to the one or more processors. Reference to "a processor" made herein can refer to a single processor, or to a plurality of processors that are communicatively coupled. The plurality of processors need not be located in proximity to each other or at a same facility. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In some example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, a touch screen, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (including, for example, cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for implementing transactions, comprising:
receiving, by a first computing system structured to maintain a transaction account, a request to set verification settings for a second computing system, wherein the verification settings comprise a threshold transaction amount;
determining, by the first computing system, an alias account number for the transaction account;
receiving, by the first computing system, a transaction request from the second computing system, the transaction request indicating the alias account number and a transaction involving the transaction account;
implementing, by the first computing system, a verification policy based on the verification settings, comprising:
 determining, by the first computing system, a predetermined threshold of a monetary amount;
 determining, by the first computing system, a first policy monetary amount;
 comparing, by the first computing system, the first policy monetary amount to the predetermined threshold;
 determining, by the first computing system, that the first policy monetary amount does not meet the predetermined threshold;
 implementing, by the first computing system, a sub-policy; and
 generating and transmitting, by the first computing system, an electronic message comprising a selectable hyperlink generated for the transaction request;
receiving, from a click server, a verification that the selectable hyperlink was navigated;
responsive to determining that the selectable hyperlink was navigated via the verification from the click server, approving, by the first computing system, the transaction request; and conserving, by the first computing system responsive to receiving an indication that at least one selectable object corresponding to the verification settings is selected, computing resources by omitting at least one computing operation.

2. The method of claim 1, further comprising:
generating and providing, by the first computing system, the at least one selectable object corresponding to the verification settings, wherein a client device verifies that the at least one selectable object is selected; and
receiving, by the first computing system, a confirmation that the at least one selectable object is selected from the client device.

3. The method of claim 1, wherein the at least one computing operation is an authentication operation.

4. The method of claim 1, wherein the request to set the verification settings is a request to change the verification settings.

5. The method of claim 1, further comprising:
generating, by the first computing system, predetermined verification settings as the verification settings for the second computing system, and wherein the request to set the verification settings for the second computing system is a request to activate the predetermined verification settings.

6. The method of claim 1, further comprising:
receiving the request to set the verification settings via a website from a logged-in user account associated with the transaction account.

7. The method of claim 1, wherein approving the transaction request comprises generating and transmitting a transaction confirmation to the second computing system.

8. A non-transitory computer-readable media having computer-executable instructions stored thereon, the instructions, when executed by at least one processor of a first computing system structured to maintain a transaction account, causing the first computing system to perform operations comprising:
receiving a request to set verification settings for a second computing system, wherein the verification settings comprise a threshold transaction amount;
determining an alias account number for the transaction account;
receiving a transaction request from the second computing system, the transaction request indicating the alias account number and a transaction involving the transaction account;
implementing a verification policy, based on the verification settings, comprising:
determining a predetermined threshold of a monetary amount;
determining a first policy monetary amount;
comparing the first policy monetary amount to the predetermined threshold;
determining that the first policy monetary amount does not meet the predetermined threshold;
implementing a sub-policy; and
generating and transmitting an electronic message comprising a selectable hyperlink generated for the transaction request;
receiving, from a click server, a verification that the selectable hyperlink was navigated;
responsive to determining that the selectable hyperlink was navigated via the verification from the click server, approving the transaction request; and
conserving, responsive to receiving an indication that at least one selectable object corresponding to the verification settings is selected, computing resources by omitting at least one computing operation.

9. The non-transitory computer-readable media of claim 8, the operations further comprising:
generating and providing the at least one selectable object corresponding to the verification settings, wherein a client device verifies that the at least one selectable object is selected; and
receiving a confirmation that the at least one selectable object is selected from the client device.

10. The non-transitory computer-readable media of claim 8, wherein the at least one computing operation is an authentication operation.

11. The non-transitory computer-readable media of claim 8, wherein the request to set the verification settings is a request to change the verification settings.

12. The non-transitory computer-readable media of claim 8, the operations further comprising:
generating predetermined verification settings as the verification settings for the second computing system, and wherein the request to set the verification settings for the second computing system is a request to activate the predetermined verification settings.

13. The non-transitory computer-readable media of claim 8, the operations further comprising:
receiving the request to set the verification settings via a website from a logged-in user account associated with the transaction account.

14. The non-transitory computer-readable media of claim 8, wherein approving the transaction request comprises generating and transmitting a transaction confirmation to the second computing system.

15. A computing system structured to maintain a transaction account and comprising at least one processor, at least one memory and computer-executable instructions stored therein, which, when executed by the at least one processor cause the computing system to:
receive a request to set verification settings for a second computing system, wherein the verification settings comprise a threshold transaction amount;
determine an alias account number for the transaction account;
receive a transaction request from the second computing system, the transaction request indicating the alias account number and a transaction involving the transaction account;
implement a verification policy, based on the verification settings, comprising:
determine a predetermined threshold of a monetary amount;
determine a first policy monetary amount;
compare the first policy monetary amount to the predetermined threshold;
determine that the first policy monetary amount does not meet the predetermined threshold;
implement a sub-policy; and
generate and transmit an electronic message comprising a selectable hyperlink generated for the transaction request;
receive, from a click server, a verification that the selectable hyperlink was navigated;
responsive to determining that the selectable hyperlink was navigated via the verification from the click server, approve the transaction request; and
conserve, responsive to receiving an indication that at least one selectable object corresponding to the verification settings is selected, computing resources by omitting at least one computing operation.

16. The computing system of claim 15, wherein the computer-executable instructions, when executed by the at least one processor, further cause the computing system to:
generate and provide the at least one selectable object corresponding to the verification settings, wherein a client device verifies that the at least one selectable object is selected; and
receive a confirmation that the at least one selectable object is selected from the client device.

17. The computing system of claim 15, wherein the at least one computing operation is an authentication operation.

18. The computing system of claim 15, wherein the request to set the verification settings is a request to change the verification settings.

19. The computing system of claim 15, wherein the computer-executable instructions, when executed by the at least one processor, further cause the computing system to:
generate predetermined verification settings as the verification settings for the second computing system, and wherein the request to set the verification settings for the second computing system is a request to activate the predetermined verification settings.

20. The computing system of claim 15, wherein the computer-executable instructions, when executed by the at least one processor, further cause the computing system to:
receive the request to set the verification settings via a website from a logged-in user account associated with the transaction account.

* * * * *